US009926400B2

(12) United States Patent
Yan et al.

(10) Patent No.: US 9,926,400 B2
(45) Date of Patent: Mar. 27, 2018

(54) METHOD OF MAKING HYDROXYARYL-FUNCTIONALIZED INTERPOLYMER BY FREE RADICAL INITIATED POLYMERIZATION

(75) Inventors: Yuan-Yong Yan, Copley, OH (US); Zengquan Qin, Copley, OH (US); Xiao-Dong Pan, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 444 days.

(21) Appl. No.: 13/381,564

(22) PCT Filed: Jul. 1, 2010

(86) PCT No.: PCT/US2010/040784
§ 371 (c)(1),
(2), (4) Date: Feb. 8, 2012

(87) PCT Pub. No.: WO2011/002994
PCT Pub. Date: Jan. 6, 2011

(65) Prior Publication Data
US 2012/0136091 A1 May 31, 2012

Related U.S. Application Data

(60) Provisional application No. 61/222,477, filed on Jul. 1, 2009, provisional application No. 61/222,310, filed on Jul. 1, 2009.

(51) Int. Cl.
C08F 297/00 (2006.01)
C08F 236/10 (2006.01)
B60C 1/00 (2006.01)
C08F 212/14 (2006.01)

(52) U.S. Cl.
CPC .......... C08F 297/00 (2013.01); B60C 1/0016 (2013.01); C08F 236/10 (2013.01); C08F 212/14 (2013.01)

(58) Field of Classification Search
USPC ................................................ 525/298, 299
See application file for complete search history.

(56) References Cited

U.S. PATENT DOCUMENTS

| | | | |
|---|---|---|---|
| 3,931,107 A | | 1/1976 | Trepka |
| 3,993,714 A * | | 11/1976 | Kanagawa et al. ............ 525/260 |
| 4,499,243 A | | 2/1985 | Rader |
| 4,678,843 A | | 7/1987 | Elmore et al. |
| 5,302,662 A * | | 4/1994 | Landry et al. .................. 525/66 |
| 5,336,726 A | | 8/1994 | DuBois |
| 5,717,015 A | | 2/1998 | Dust et al. |
| 6,342,559 B1 | | 1/2002 | Takagishi |
| 7,056,985 B2 | | 6/2006 | Faust et al. |
| 7,208,171 B2 | | 4/2007 | Messersmith et al. |
| 7,226,979 B2 | | 6/2007 | Faust et al. |
| 8,871,871 B2 * | | 10/2014 | Pan ......................... C08C 19/44 525/326.5 |

| | | | |
|---|---|---|---|
| 2003/0216522 A1 | | 11/2003 | Oshima et al. |
| 2007/0037956 A1 * | | 2/2007 | Hogan et al. ................. 528/125 |
| 2010/0286348 A1 | | 11/2010 | Pan et al. |
| 2011/0028632 A1 | | 2/2011 | Qin et al. |
| 2012/0130009 A1 | | 5/2012 | Qin et al. |
| 2012/0136113 A1 | | 5/2012 | Yan et al. |
| 2013/0035437 A1 | | 2/2013 | Pan et al. |

FOREIGN PATENT DOCUMENTS

| | | |
|---|---|---|
| EP | 0442068 A2 | 8/1991 |
| EP | 0455191 A2 | 11/1991 |
| JP | 49-41116 | 11/1974 |
| JP | H4-53807 A | 2/1992 |
| JP | 05-230126 H | 9/1993 |
| JP | 07-258476 H | 10/1995 |
| JP | 3057508 B2 | 4/2000 |
| JP | 2007-211054 | 8/2007 |

OTHER PUBLICATIONS

G. Westwood et al., "Simplified Polymer Mimics of Cross-Linking Adhesive Proteins," Macromolecules, May 4, 2007, pp. 3960-3964, 2007, 40 (American Chem. Soc.; Washington, DC).
S. Ganguly et al., "Effect of surface modification of carbon black of 1,2-dihydroxy benzene and 1,2,3-trihydroxy benzene on a natural rubber-carbon black composite," Indian J. Chem. Technol., 2005, pp. 695-700, vol. 12, No. .6 (Council of Scientific & Industrial Research; New Delhi, India)—abstract only.
A. Banerjee, "Novel approach of rubber-filler interaction through surface modification of carbon black," version of article appearing in Apr. 2003 Rubber World Magazine (article downloaded from thefreelibrary.com).
A. Hirao et al., "Polymerization of Monomers Containing Functional Groups Protected by Trialkylsilyl Groups, 1—Synthesis of Poly(40vinylphenol) by Means of Anionic Living Polymerization," Makromol. Chem. Rapid Commun., 1982, 3, pp. 941-946 (Wiley-VCH; Weinheim, Germany).
K. Jankova, "Synthesis by ATRP of poly(ethylene-co-butylene)-block-polystyrene, poly(ethylene-co-butylene)-block-poly(4-acetoxystyrene) and its hydrolysis product poly(ethylene-co-butylene)-block-poly(hydroxystyrene)," Macromol. Rapid Commun., 1999, 20, pp. 219-223 (Wiley-VCH Verlag GmbH; Weinheim, Germany).
K. Satoh et al., "Direct Living Cationic Polymerization of p-Hydroxystyrene with Boron Trifluoride Etherate in the Presence of Water," Macromolecules, Jul. 8, 2000, pp. 5405-5410, 2000, 33 (American Chem. Society; Washington, DC).

(Continued)

Primary Examiner — Nicole Buie-Hatcher
(74) Attorney, Agent, or Firm — Meredith E. Hooker; David G. Burleson

(57) ABSTRACT

Radical polymerization techniques can be used to polymerize monomers that include a class of hydroxyaryl compounds so as to provide polymers that exhibit desirable properties including, but not limited to, reduced hysteresis. Compositions such as vulcanizates in which such polymers can be utilized and products such as tire components that incorporate and/or are manufactured from such compositions also are provided.

17 Claims, No Drawings

(56) References Cited

OTHER PUBLICATIONS

M. Yu et al., :"Role of L-3,4-Dihydroxyphenylalanine in Mussel Adhesive Proteins," J. Am. Chem. Soc., 1999, 121, pp. 5825-5826 (American Chem. Soc.; Washington, DC).

D.M. Weisberg et al., "Synthesis and Characterization of Amphiphilic Poly(urethaneurea)-comb-polyisobutylene Copolymers," Macromolecules, 2000, 33, pp. 4380-4389 (American Chem. Society; Washington, DC).

A. Hirao et al., "Recent advance in living anionic polymerization of functionalized styrene derivatives," Prog. Polym. Sci., 2002, vol. 27, pp. 1399-1471 (Elsevier Science Ltd.; London, UK).

H. Lee et al., "Single-molecule mechanics of mussel adhesion," PNAS, 2006, vol. 103, No. 35, pp. 12999-13003 (The Nat'l Acad. of Sciences of the USA; Washington, DC).

K. Satoh et al., "A Linear Lignin Analogue: Phenolic Alternating Copolymers from Naturally Occurring beta-Methylstyrene via Aqueous-Controlled Cationic Copolymerization," J. Am. Chem. Soc., 2007, 129, pp. 9586-9587 (American Chem. Society; Washington, DC).

H. Lee et al., "A reversible wet/dry adhesive inspired by mussels and geckos," Nature, Jul. 19, 2007, vol. 448, pp. 338-342 (Nature Publishing Group; New York, NY).

R. Quirk et al., "Anionic synthesis of chain-end functionalized polymers using 1,1-diphenylethylene derivatives. Preparation of 4-hydroxyphenyl-terminated polystyrenes," Makromol. Chem., 1989, 190, pp. 487-493 (Wiley-VCH; Weinheim, Germany).

R. Quirk et al., "Recent Advances in the Anionic Synthesis of Chain-End Functionalized Polymers," Macromol. Symp., 2003, 195, pp. 69-74 (Wiley-VCH Verlag GmbH & KGaA; Weinheim, Germany).

International Search Report and Written Opinion in int'l appl. No. PCT/US2010/040784 (dated Feb. 25, 2011), 11 pp.

Extended European search report in EP appl. No. 10794764.0 (dated Dec. 19, 2012), 5 pp.

Official action in CN appl. No. 201080038976, dated May 17, 2013 (5 pp., plus 4-page translation).

Official action mailed by JPO on Jan. 6, 2015 in JP appl. No. 2012-519600—4 pp., plus 5-pg translation.

Official action mailed by JPO on Jul. 7, 2015 in JP appl. No. 2012-519600—3 pp., plus 3-pg translation.

Official action mailed by KIPO dated Aug. 8, 2016 in KR appl. No. 10-2012-7002688—7 pp., plus 6-pg translation.

\* cited by examiner

METHOD OF MAKING HYDROXYARYL-FUNCTIONALIZED INTERPOLYMER BY FREE RADICAL INITIATED POLYMERIZATION

CROSS-REFERENCE TO RELATED APPLICATIONS

This is a national stage filing under 35 U.S.C. § 371 of international application no. PCT/US2010/040784, filed 1 Jul. 2010, which claimed priority to and the benefit of U.S. provisional patent appl. Nos. 61/222,310 and 61/222,477, both filed 1 Jul. 2009.

BACKGROUND INFORMATION

Good traction and resistance to abrasion are primary considerations for tire treads; however, motor vehicle fuel efficiency concerns argue for a minimization in rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa. Efforts to reduce hysteresis should not compromise traction properties, particularly traction performance in wet conditions, a property that combines many complex factors such as tread rubber deformation induced by road surface asperities, rate of water drainage, possible adhesive interactions at the interface between rubber and road surface, and possible interactions between filler particles and road surface components.

Tread compositions typically contain one or more elastomers and one or more types of reinforcing materials such as particulate carbon black and silica; see, e.g., *The Vanderbilt Rubber Handbook*, 13th ed. (1990), pp. 603-04. Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other.

One method for increasing particle dispersion is through chemical modification of one or more of the elastomers, typically at a terminus by reaction of a living (i.e., anionically initiated) polymer with a functional terminating agent; see, e.g., U.S. Pat. Nos. 3,109,871, 4,647,625, 4,677,153, 5,109,907, and 6,977,281, as well as references cited therein and later publications citing these patents.

A recent approach has involved functionalization with a compound that includes an aryl group that includes multiple hydroxyl functionalities, which has the advantage of being effective with conventional filler particles, such as silica and carbon black, as well as non-conventional mineral particles such as various metal oxides and hydroxides; see WO 09/086490 (int'l appl. no. PCT/US2008/088384). This approach also has shown evidence of providing vulcanizates that exhibit good traction properties, even in wet conditions.

The functionalized polymers described in WO 09/086490 are said to be capable of preparation via solution techniques, with anionic initiation and coordination catalysis as possible propagation techniques. However, certain types of monomers can be difficult or impossible to polymerize by those propagation mechanisms. Accordingly, alternative processes for preparing polymers that include mer resulting from incorporation of compounds that include an aryl group with multiple hydroxyl moieties remain desirable.

SUMMARY

Vulcanizates with desirable properties can be obtained from compounds employing polymers that include hydroxyl group-containing aryl functionalities. Such polymers enhance interactivity with both conventional and non-conventional fillers.

Provided herein is a method of providing polymers that include mer derived from one or more members of a group of hydroxyaryl compounds. The method involves free radical initiation of a plurality of monomers. The monomers to be polymerized can include at least one type of monomer which includes an aryl group having at least one and preferably more than one directly bonded hydroxyl group and/or an —OR moiety where R is a hydrolyzable protecting group. Optionally, the resulting "living" polymer can be reacted with a terminating compound.

The method can include an additional reaction step in which each protecting group is hydrolyzed so as to provide aryl group(s) that has at least one directly bonded hydroxyl group. This additional step can involve reaction of the "living" polymer with a terminating compound(s). This process can result in a polymer that includes multiple A mer units, which include ethylenic unsaturation and at least one B mer unit that includes a pendent aryl group having one or more directly bonded hydroxyl groups (after hydrolysis of the R moieties); other types of mer optionally can be included as well. Where more than one B mer is included in the resulting polymer, the B mer can be separated or contiguous, i.e., form a block. If a block of B units is present, it can be relatively close to a terminus of the polymer, i.e., no more than six, four or two polymer chain atoms from a terminal unit. Selective introduction of the monomer(s) from which the B mer are derived can control the position(s) of the resulting B mer along the polymer chain. For example, one or more B units can be incorporated into the polymer after polymerization of the other monomers has been accomplished, optionally followed by quenching or reaction with a compound that can provide additional terminal functionality to the polymer.

Methods of using these types of polymers, compositions such as vulcanizates in which they can be utilized, and products such as tire components that incorporate and/or are manufactured from such compositions also are provided.

In certain embodiments, the monomers to be polymerized can include polyene(s), some or all of which can be conjugated dienes. In these and other embodiments, the polymer also can include vinyl aromatic mer which preferably are incorporated substantially randomly with the conjugated diene mer along the polymer chain.

The polymer can take any of a variety of architectures including substantially linear, branched, star-shaped, etc. Particularly, but not necessarily exclusively, where the polymer is substantially linear, it can include as a terminal moiety the radical of a functionalizing compound, one example of which is a compound that includes at least one aryl group having one or more hydroxyl and/or —OR moieties.

Regardless of architecture or degree of randomness, these types of polymers have been found to exhibit excellent interactivity with a wide variety of particulate fillers including carbon black and silica as well as non-conventional fillers such as inorganic oxides and hydroxides, clays and the like.

Other aspects of the present invention will be apparent to the ordinarily skilled artisan from the description that follows. To assist in understanding that description, certain definitions are provided immediately below, and these are intended to apply hereinthroughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"random interpolymer" means an interpolymer having mer units derived from each type of constituent monomer incorporated in an essentially non-repeating manner and being substantially free of blocks, i.e., segments of three or more of the same mer;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"aryl group" means a phenyl group or a polycyclic aromatic radical;

"protecting group" means a group that (1) is sufficiently reactive toward the oxygen atom of a hydroxyl functionality that, under a first set of reaction conditions, it can replace the H atom of that group, (2) is non-reactive toward free radical polymers and the initiators used to provide them, and, optionally, (3) can be replaced by a H atom under a second set of reaction conditions which differ from the first set;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"living" refers to a polymer resulting from a polymerization wherein there is essentially no chain transfer and essentially no chain termination;

"terminus" means an end of a polymeric chain; and

"terminal moiety" means a group or functionality located at a terminus.

DESCRIPTION OF ILLUSTRATIVE EMBODIMENTS

As apparent from the foregoing Summary, the method can involve any of a variety of possible permutations or combinations thereof, and the resulting polymer can be characterized in a variety of ways. Generally, the polymer includes polyene mer and one or more of the aforedescribed B mer units. In at least certain embodiments, the polymer also can include directly bonded pendent aromatic groups.

The following describes the production and use of a polymer that includes at least one B mer, i.e., a unit that includes a pendent aryl, preferably phenyl, group with at least one directly bonded hydroxyl and/or OR group. Where more than one B mer unit is present, they can be non-adjacent to each other or can constitute a block of the polymer. In some embodiments, a block of B units can be within ten, eight, six, four, or even two polymer chain atoms from a terminus of the polymer. In some of the described embodiments, the resulting polymer includes multiple A mer, i.e., alkene units (some or all of which can be derived from one or more types of dienes, particularly one or more types of conjugated dienes, e.g., 1,3-butadiene), and optionally multiple C mer, i.e., units that include a pendent aryl group, particularly a phenyl group. Each of the A, B and C mer can result from incorporation of ethylenically unsaturated monomers. In addition or alternatively, the polymer can include mer from other types of ethylenically unsaturated monomers such as vinyl aromatic monomers.

The A mer typically result from incorporation of polyenes, particularly trienes (e.g., myrcene) and dienes, particularly $C_4$-$C_{12}$ dienes and even more particularly conjugated dienes such as 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, isoprene, 4-methyl-1,3-pentadiene, 2,4-hexadiene, and the like. Some or all of the A mer can be derived from one or more types of dienes, particularly one or more types of conjugated dienes, e.g., 1,3-butadiene. In some embodiments, essentially all (i.e., at least 95%) of the polyenes can be dienes, particularly conjugated dienes.

Polyenes can incorporate into polymeric chains in more than one way. Especially for tire tread applications, controlling this manner of incorporation can be desirable, and techniques for achieving this control are discussed below. A polymer chain with an overall 1,2-microstructure, given as a numerical percentage based on total moles of polyene, of from about 8 to about 80%, optionally from about 15 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total moles of polyene, is considered to be substantially linear.

The polymer chain also can include pendent aromatic groups, which can be provided by C mer, particularly those derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, C mer can constitute from about 1 to about 70%, from about 10 to about 60%, or from about 20 to about 50% of the polymer chain; random microstructure can provide particular benefit in, for example, rubber compositions used in the manufacture of tire treads. Where a block interpolymer is desired, C units can constitute from about 1 to about 90%, generally from about 2 to about 80%, commonly from about 3 to about 75%, and typically about 5 to about 70% of the polymer chain.

Exemplary interpolymers include those in which one or more conjugated dienes are used to provide the A units, i.e., polydienes; among these, 1,3-butadiene can be one of several or the only polydiene employed. Where C units are desired, they can be provided from styrene so as to provide, for example, SBR. In each of the foregoing types of exemplary interpolymers, one or more B units also are included.

B units include a pendent aryl group which includes one or more directly bonded hydroxyl groups, preferably at least 2 hydroxyl groups. Because the H atoms of hydroxyl groups are active and can interfere with certain polymerization processes, the one or more B units can be provided from compounds that include R groups, i.e., groups that are non-reactive in the types of conditions utilized when polymerizing ethylenically unsaturated monomers but which later can be removed, typically by hydrolysis or similar reaction, so as to provide the desired hydroxyl groups. The particular type(s) of protecting group(s) employed should not interfere with the polymerization process, and the de-protection process employed to provide hydroxyl groups should not destroy or otherwise react with ethylenic unsaturation in the polymer resulting from the presence of A units. A non-limiting class of useful protecting groups is trialkylsiloxy groups, which can be provided by reacting hydroxyl groups with a trialkylsilyl halide. While the following examples employ Cert-butyldimethylsiloxyl groups, others such as acetal, tert-butyl ether, 2-methoxyethoxy ether, and the like also can be used.

The number of hydroxyl and/or OR groups on the aryl, typically phenyl, group of each B unit need not be the same. Where the number is the same, the hydroxyl or OR groups need not be at the same position(s) on those rings. Using a phenyl group as a representative aryl group, relative to the point of attachment of the phenyl group to the polymer chain, a single hydroxyl or OR group can be located ortho, meta, or para on the phenyl ring, while multiple hydroxyl or OR groups can be provided 2,3-, 2,4-, 2,5-, 2,6-, 3,4-, 3,5-, 3,6-, 2,3,4-, 2,3,5-, etc., on the phenyl ring.

B units typically are provided from vinyl aromatic compounds that include one or more hydroxyl and/or hydroxyl-producing groups directly attached to their aryl, typically phenyl, rings. Such compounds can be represented by the general formula

$$CH_2=CHR^1 \qquad (I)$$

where $R^1$ is an aryl group, specifically a phenyl group or two or more fused aromatic rings, that includes n hydroxyl or OR groups with 1≤n≤5 and each R independently being the type of protecting group described above, (Although each R need not be identical, ease and simplicity typically result in a single type of R moiety being used in a given compound.) The hydroxyl or OR groups can be substituents of the same ring of $R^1$ or can be substituents of different rings and, where $R^1$ contains three or more hydroxyl or OR groups, two of them can be substituents of one ring with the other(s) being substituent(s) of other ring(s). In one embodiment, two hydroxyl or OR groups can be at the 3 and 4 positions of the same ring within the aryl group, preferably a phenyl group. Where $R^1$ is other than a phenyl group and includes more than one hydroxyl OR group and where the hydroxyl or OR groups are on more than one ring, at least two of the hydroxyl or OR groups preferably are least somewhat proximate, i.e., directly bonded to ring C atoms that are separated by no more than 4, preferably 3, and even more preferably 2, other ring atoms.

The number of B units typically is small relative to the number of other units; a relatively small number of B units has been found to provide a satisfactory level of desired properties, with further improvements in those properties not necessarily being proportional to the number of B units present. This relatively small number can be expressed in a number of ways. For example, the weight percentage of the final polymer attributable to B units commonly is less than 2%, more commonly from about 0.1 to about 1.5%, and typically from about 0.2 to about 1.0%. The percentage of B mer relative to the total number of mer in the polymer commonly is less than 1%, more commonly from about 0.01 to about 0.75%, and typically from about 0.05 to about 0.5%. The total number of B units in a given polymer generally is from 1 to several dozen, commonly from 1 to 12, more commonly from 1 to 10, and most commonly from 1 to 5.

The B units can be separated from one another, or two or more B units can be contiguous along the polymer chain. (While the ordinarily skilled artisan understands how to synthesize random and block interpolymers, each is discussed in some detail below.) Further, the B units can incorporated near the beginning of the polymerization, near the end of the polymerization, or at any one or more intermediate points; in the first two of the foregoing possibilities, a B unit can be provided within 6 chain atoms of, within 2 units of, adjacent to a terminus of the polymer, or as a terminal unit, either alone or as part of a block.

Based on the foregoing description of the relative amounts of B mer and C mer in the resulting interpolymers, the interpolymer can contain from about 99% to about 28% A met, from about 90% to about 38% A mer or from about 80% to about 48% A mer (for a random interpolymer) or about 99% to about 8% A mer, from about 98 to about 18% A mer, from about 97% to about 23% A mer or from about 95% to about 28% A mer (for a block interpolymer). The remainder of this description focuses on radical polymerization techniques for providing interpolymers of the type just described. The terms radical polymerization and free radical polymerization are used interchangeably herein.

Under conventional radical polymerization conditions, emulsion or suspension polymerization can be conducted utilizing a polymerization initiator at a temperature ranging from −10° C. to 200° C., preferably from 0° C. to 100° C. Preferably the radical polymerization is an emulsion polymerization.

The polymerization initiator used in the radical polymerization may be any of the conventional radical polymerization initiators which include, for example, organic peroxides such as benzoyl peroxide, lauryl peroxide, tert-butyl hydroperoxide, cumene hydroperoxide, p-methane hydroperoxide, di-tert-butyl peroxide, dicumyl peroxide and the like. Additionally, radical polymerization initiators can include peracids and esters thereof such as peracetic acid and potassium persulfate, peroxides such as lauryl peroxide and benzoyl peroxide, and azo compounds such as 2,2'-azobisisobutyronitrile, and a mixture thereof. Any of these radical polymerization initiators may be used alone or in combination of two or more.

Other types of "living" free radical polymerizations can provide a high degree of control over the composition, architecture, phase morphology and microstructure of polymers produced according to the disclosure. These types of free radical polymerizations are described in a variety of references, including U.S. Pat. No. 6,992,156 the disclosure of which is incorporated herein by reference. Such polymerizations include Atom Transfer Radical Polymerization (ATRP), Nitroxide Mediated Polymerization (NMP), Reversible Addition Fragmentation Transfer (RAFT), Degenerative Transfer (DT) as well as other polymerization reaction Stable Free Radicals (SFR). Due to the living nature of these types of radical polymerizations, additional or other further functionality can be incorporated into the resulting polymers.

A chain transfer agent such as mercaptans including tert-dodecylmercaptan, n-dodecylmercaptan and the like, carbon tetrachloride, thioglycols, diterpene, terpinolene, .gamma.-terpinene and the like may also be used in combination.

An emulsifier employed in an emulsion polymerization may, for example, be an anionic surfactant, a nonionic surfactant, a cationic surfactant as well as an amphoteric surfactant and the like. A fluorine-based surfactant may also be employed. Any of these emulsifiers may be used alone or in combination of two or more.

A suspension stabilizer employed in a suspension polymerization may, for example, be polyvinyl alcohol, sodium polyacrylate, hydroxyethyl cellulose and the like. Any of these suspension stabilizers may be used alone or in combination of two or more.

In an emulsion or a suspension polymerization, monomers, a radical polymerization initiator and the like may be charged all to the reaction vessel at once, or they may be added continuously or intermittently over the period of the reaction. The polymerization may be performed in an oxygen-free reaction vessel at 0 to 80° C. with changing temperature, stirring condition or the like as desired during the reaction. The polymerization may be of a continuous system or a batch system.

Polymerization can be conducted at any of a wide range of pressures, although the polymerization typically is conducted under a pressure at which all of the monomers can be maintained in the liquid phase, Higher pressures can be utilized as needed or desired, typically by pressurizing the reactor with a gas that is inert to the polymerization reaction.

The polymerization can be agitated, and the reaction allowed to proceed for a period of time sufficient to result in the formation of the desired polymer, usually from about 0.01 to about 48 hours, commonly from about 0.02 to about 36 hours, and typically from about 0.05 to about 24 hours.

Where the B units are desired to be located preferentially at one or more points along the polymer chain, one or more compounds as represented by formula (I) can be staged so as to incorporate at the desired location(s). Where the other types of monomers are essentially depleted (i.e., polymerized), staged delivery of the formula (I)-type compounds can result in a block of B units which, if no additional monomers are charged to the polymerization vessel, can result in a terminal B block. Alternatively, the polymerization can be started with only formula (I)-type compounds present so as to form an initial block of B units followed by addition of other types of monomers designed to provide other types of units, either in a random or block manner.

Polymers that include one or more B units, regardless of whether randomly distributed or provided as a block, may have improved cold flow properties relative to similar polymers not containing B units. The level of improvement may scale with the number of B units present, although the correlation is not necessarily linear and is impacted by the position (e.g., near a chain end versus mid-chain) and the proximity (e.g., random versus block) of the B units.

After a desired degree of conversion has been reached, the resulting polymer latex can be stabilized, steam stripped to remove any unreacted monomer, coagulated using inorganic acid and chemical aids and washed and dried.

Where such additional or other functionality is desired to enhance interaction with particulate filler, a living polymer can be further functionalized by reaction with an appropriate terminating reagent, coupling agent and/or linking agent. The ordinarily skilled artisan is familiar with numerous examples of terminal functionalities that can be provided through this type of post-polymerization functionalization. For additional details, the interested reader is directed to any of U.S. Pat. Nos. 4,015,061, 4,616,069, 4,935,471, 5,153,159, 5,149,457, 5,196,138, 5,329,005, 5,496,940, 5,502,131, 5,567,815, 5,610,227, 5,663,398, 5,786,441, 6,812,295, 7,153,919, etc., as well as references cited in these patents and later publications citing these patents; see also U.S. Patent Publ. Nos. 2007/0149744, 2007/0037956, 2007/0078232, 2008/0027171 and the like.

Reaction of most types of functionalizing compounds with living polymers can be performed relatively quickly (a few minutes to a few hours) at moderate temperatures (e.g., 0° to 75° C.). Although not always necessary, quenching can be conducted by stirring the polymer and an active hydrogen-containing compound, such as an alcohol or acid, for up to about 120 minutes at temperatures of from about 25° to about 150° C.

During polymerization and any optional post-polymerization functionalization, the anaerobic conditions typically present in the polymerization vessel are such that essentially all R moieties remain. Ensuring that most, if not all, of these are converted to hydrogen atoms typically is desirable to enhance interactivity between the functionalized polymer and particulate filler (when the polymer is used in filled compositions). While functionalizing reaction conditions (or the conditions involved in quenching and processing, described below) might be sufficient to hydrolyze some of the $R^2$ groups, a separate hydrolysis reaction designed to ensure complete conversion to H atoms can be utilized. The ordinarily skilled artisan is aware of a variety of potentially useful hydrolyzing reactions, although one exemplary route is set forth below in the examples.

During the foregoing processing and/or the compounding described below, some of the hydroxyl groups created by de-protection of the B units might undergo further reaction, e.g., with other functional groups present in the compound.

Polymers made according to radical techniques generally have a number average molecular weight ($M_n$) of up to about 1,000,000 Daltons. In certain embodiments, the $M_n$ can be as low as about 2000 Daltons; in these and/or other embodiments, the $M_n$ advantageously can be at least about 10,000 Daltons or can range from about 10,000 to about 500,000 Daltons or from about 20,000 to about 350,000 Daltons. Often, the $M_n$ is such that a polymer sample exhibits a gum Mooney viscosity ($ML_4/100°$ C.) of from about 2 to about 150, more commonly from about 2.5 to about 125, even more commonly from about 5 to about 100, and most commonly from about 10 to about 75.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of about 1 to about 100 phr, preferably in an amount from about 5 to about 80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr.

When silica is employed as a reinforcing filler, addition of a coupling agent such as a silane is customary so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]-tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful. The additional fillers can be utilized in an amount of up to about 40 phr, typically up to about 20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of about 120° to about 130° C. and increases until a so-called drop temperature, typically about 165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from about 90° C. to a drop temperature of about 150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at about 60° to about 65° C. and not going higher than about 105° to about 110° C.

The relevant teachings of all patent documents mentioned above are incorporated herein by reference.

That which is claimed is:

1. A method for providing an ethylenically unsaturated polymer that comprises multiple hydroxyaryl functional groups, said method comprising radically initiating polymerization of a plurality of monomers that comprises at least one polyene, at least one $C_8$-$C_{20}$ vinyl aromatic compound and at least one compound defined by general formula (I),

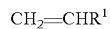
(I)

where $R^1$ is an aryl group having from 2 to 5 —OR substituents with R being a protecting group which is non-reactive during said polymerization but which can be removed by a process that does not destroy or react with ethylenic unsaturation in said ethylenically unsaturated polymer, said polymer comprising from 1 to 12 B mer resulting from incorporation of said at least one compound defined by general formula (I), at least three of said B mer constituting a contiguous block, said at least one $C_8$-$C_{20}$ vinyl aromatic compound providing 20 to 50% of the constituent mer units of said polymer.

2. The method of claim 1 wherein said plurality of monomers comprises one or more types of dienes.

3. The method of claim 1 wherein said one or more types of dienes comprises at least one type of conjugated diene.

4. The method of claim 3 further comprising reacting said polymer with a heteroatom-containing compound so as to provide terminal functionalization to said polymer.

5. The method of claim 2 further comprising reacting said polymer with a heteroatom-containing compound so as to provide terminal functionalization to said polymer.

6. The method of claim 1 wherein the resulting polymer is substantially linear.

7. The method of claim 6 further comprising reacting said polymer with a heteroatom-containing compound so as to provide terminal functionalization to said polymer.

8. The method of claim 1 wherein said radically initiated polymerization employs a peroxide-based initiator.

9. The method of claim 1 wherein said radically initiated polymerization employs a radical initiator, chain transfer agent, emulsifier and, optionally, a stabilizer.

10. The method of claim 1 further comprising reacting said polymer with a heteroatom-containing compound so as to provide terminal functionalization to said polymer.

11. The method of claim 1 wherein said plurality of monomers are provided in an aqueous medium.

12. The method of claim 1 further comprising hydrolyzing each of said —OR substituents so as to provide hydroxyl groups.

13. The method of claim 1 wherein said contiguous block is no more than six polymer chain atoms from a terminus of said ethylenically unsaturated polymer.

14. The method of claim 1 wherein said aryl group is a phenyl group.

15. The method of claim 14 wherein said phenyl group comprises —OR substituents at its 3 and 4 ring positions.

16. The method of claim 1 wherein each R independently is a trialkylsiloxy, acetal, tert-butyl ether, or 2-methoxy-ethoxy ether group.

17. The method of claim 1 wherein mer from said at least one polyene and from said at least one $C_8$-$C_{20}$ vinyl aromatic mer are randomly distributed.

\* \* \* \* \*